Oct. 14, 1952     G. W. DAHL     2,613,962
SHAFT SEAL
Filed April 19, 1948
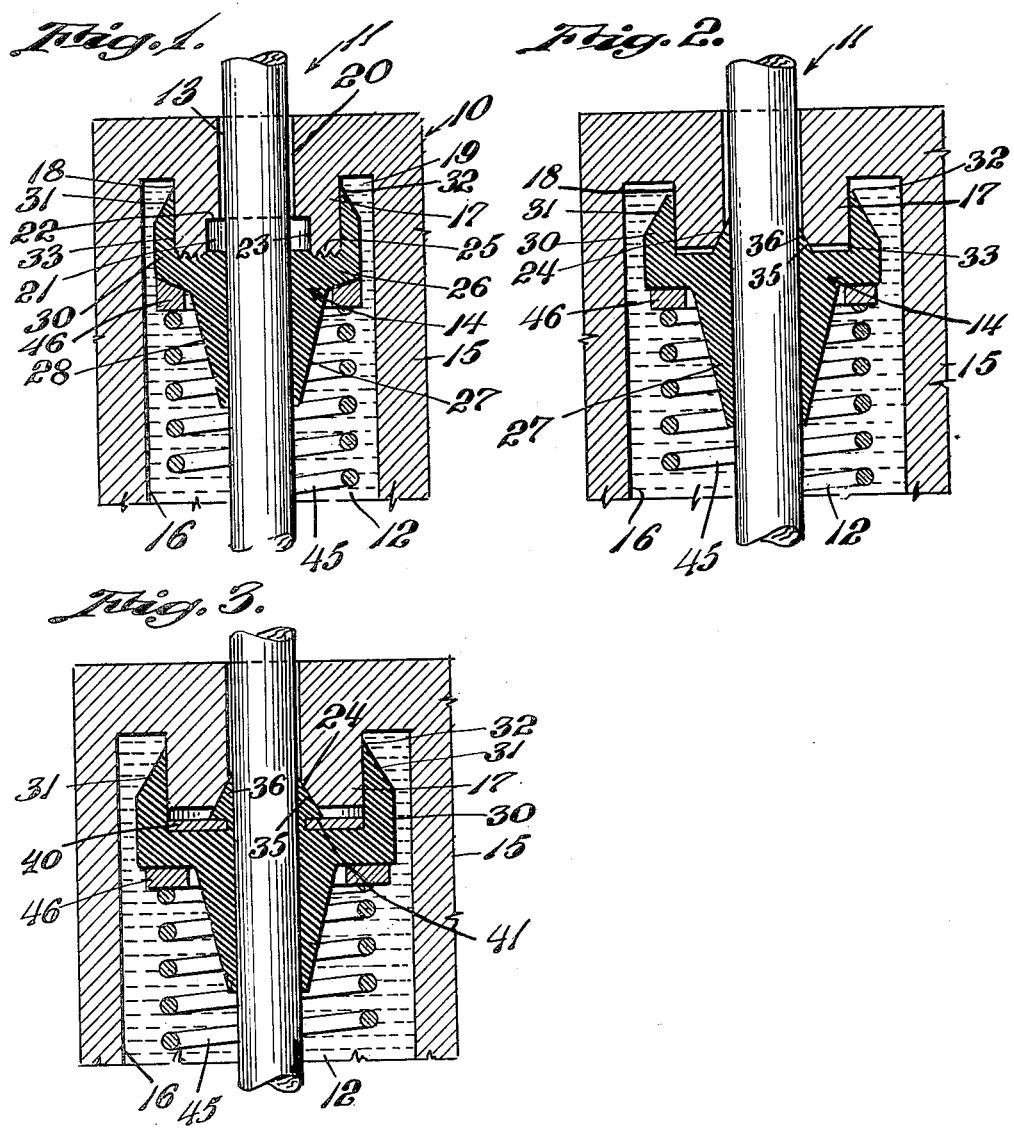
INVENTOR.
George W. Dahl
BY
Barlow & Barlow
ATTORNEYS.

Patented Oct. 14, 1952

2,613,962

UNITED STATES PATENT OFFICE 2,613,962

SHAFT SEAL

George W. Dahl, Barrington, R. I., assignor, by mesne assignments, to Reconstruction Finance Corporation, Boston, Mass., a corporation of the United States Application April 19, 1948, Serial No. 21,811

3 Claims. (Cl. 286—26)

This invention relates to a seal for use in connection with relatively movable members, such as an axially slidable or rotatable shaft or rod which may be utilized for operating some movable part, such as a valve plug, a rotary pump, or the like, and which is exposed to fluids which, except for the seal, may leak from the joint between the rod or shaft and the parts relative to which it moves.

In the use of controls or valves of certain types, some shaft is utilized for transferring movement from one part to another. This shaft is enveloped or subjected to the fluids which are controlled; and in cases where this fluid is under pressure, the fluid tends to escape at such joints as may be provided between the operating parts. Seals of various types have been attempted between the shaft and the body or casing through which it operates, but these are usually of a complicated structure or else the seal so restricts the movement of the shaft that pressures of a magnitude greater than desired are necessary for the movement of the shaft relative to the body. Also, a soft packing about a shaft may exert excessive wear.

One of the objects of this invention is to provide a seal about an operating rod or shaft which will tightly seal the rod or shaft against such pressure as the same may be subjected to and yet provide an easy movement of the shaft therein.

Another object of this invention is to provide a seal which will be sufficiently flexible so that the pressure to which it is subjected will force the same against both the shaft and body members to provide a seal whereby when the pressure is increased, this seal will be made tighter.

Another object of this invention is to provide a material which will have a waxy finish and to polish the shaft so that a good sliding or rotary action may be had between the shaft and the seal as the shaft moves therein even though the seal is forced firmly against it.

Another object of this invention is to use as a seal one of the waxy type resins such as polytetrafluoroethylene.

Another object of this invention is to provide a seal which will not readily dry out or become hardened and non-flexible in the atmosphere.

Another object of the invention is to use a material which will have sufficient cold flowing characteristics to enter voids and seal the same against the entry of the fluid to be sealed.

With these and other objects in view, the invention consists of certain novel features of construction as will be more fully described and particularly pointed out in the appended claims.

In the accompanying drawings:

Figure 1 is a sectional view illustrating a shaft member and a body member with my seal in a position between the two to prevent the movement of the liquid in one direction along the shaft member;

Figure 2 is a view similar to Figure 1, but showing a modified form of the parts; and Figure 3 is a view similar to Figure 1, but showing a still different modified form of the seal member.

In proceeding with this invention, I provide a suitable space about a cylindrical shaft and between it and the body through which it extends for a seal member which will have a tapered neck with the neck engaging the cylindrical shaft, so that as pressure is applied, the neck will press against the shaft and provide a good seal therewith. Further, I provide a boss on the body and cut the end of the seal member, so as to receive this boss, and then taper the seal member on its outer surface to engage the outer surface of the boss so that a similar action to that provided on the neck along the shaft will occur and a good seal will be provided by this action on the body, and in some cases, the seal member is so arranged that it will move in the manner of a piston, and then I provide an additional tapered surface to act directly between the body and the shaft so that this piston movement or tendency to move will cause a seal between the body and the shaft, at an additional location.

With reference to the drawings, 10 designates generally the body member which may be shaped as illustrated in the various views, and 11 designates a shaft or rod which extends through the body and which is illustrated in this particular instance as being cylindrical. The shaft member 11 will, of course, be cylindrical in cases where it rotates, but may be of other shapes such as square or the like in cases where the movement of the shaft is axial with respect to the body 10. A fluid is located in the space 12, and this fluid will escape along the shaft 11 as shown by the clearance 13, between the shaft and the body 10, except for a seal which is provided and which seal is designated generally 14.

The body 10 is represented as having a solid part 15 with a bore 16 extending inwardly from one end thereof, while a boss 17 projects inwardly from one end of the bore 16 presenting an outer surface 18 substantially concentric with the cylindrical shaft 11, and as this surface is spaced from the bore 16, there is provided an annular space 19 into which a portion of the sealing member 14 extends.

The boss 17 and the body 15 is provided with a bore or cylindrical opening 20 through which the shaft member 11 extends, and is also provided with a recess 21 at the end of this boss, which recess is provided with an end wall 22 and side walls 23 concentric with the shaft in Figure 1, while in Figures 2 and 3, the recess is formed by a tapered wall 24 as will be more fully described. In Figure 1 the end of the boss is serrated as at 25 so as to provide a roughened end surface.

The sealing member 14 comprises a body part 26 with a neck 27 tapered on its outer surface as at 28 extending along the shaft member 11. The other end of this sealing member 26 is cupped to receive the boss 17 and provided with walls 30 which are tapered as at 31 to a narrow edge 32 on the outer surface, while the inner surface 33 is of a size to approximately fit the convex surface 18 of the boss. Thus, as the pressure on the liquid in the space 12 increases, the narrower or tapered edges of the walls 27 and 30 will be pressed inwardly against the surface of the shaft member 11 or the surface of the boss 17 or the body member and will provide a good seal at these locations.

The pressure of the fluid in the space 12 will also have the action of thrusting the seal 14 axially along the shaft against the end of the boss, and, as shown in Figure 1, the serrated surface 25 will serve to provide a good seal at this location. However, as shown in Figures 2 and 3, the seal will be provided with a projection 35 which is tapered on its surface as at 36 so as to engage the tapered surface 24 along the recess in the boss, and as this sealing member 14 is forced upwardly on the shaft 11, it will wedge itself against this surface 24 and serve to not only provided a good seal along this tapered surface, but will serve to force the sealing material inwardly, so that an additional seal will be provided along the shaft. Further, by reason of this taper, should there be a pressure on the outside of the casing greater than the pressure within, it would by reason of this tapered edge serve to prevent an entry of the fluid inwardly along the shaft.

In Figure 3 a condition similar to that provided in Figure 2 is present, but in this case, in order to provide a reenforcement of the sealing member 14 in its piston-like action, I have inserted a stiff member 40 on the bottom of the cup of the sealing member, and caused it to enter a recess 41 beneath the projection 36 which extends upwardly from the bottom of the cup.

The shaft member 11 which is utilized is highly polished so that it will have a very low coefficient of friction, and the characteristics of the material which is used in the sealing member is important. The material I have selected is a resin and is of a single homogeneous solid piece of an inert, water-resistant, non-metallic, wax-like material which has a characteristic of flowing somewhat when cold and under pressure. It is easily worked by machine operation. Chemically, the material is polytetrafluoroethylene or some equivalent material. It has the characteristic of being workable down to minus 300° F., and will withstand all of the usual acids which might be encountered and which would have corrosive effects on many materials. Should there be a scratch or some void occur in one of the parts which is in contact with this material, the material will have the quality or filling that void by cold flow, and will thus effectively provide a seal by a change of its contour in a desirable manner.

By reason of its wax-like surface, and by reason of the high polish on the rod which moves with reference to this material, that is the material is fixed to the body, but the shaft member moves relatively to it will provide a very low resistance or frictional effect and thus one which will not bind or deter the movement of the shaft member even though considerable pressure may exist upon it, and this is a particularly desirable characteristic in meters or where there is movement in a gauge, or where a test is to be performed.

The material will not dry out or become crystalized, but it cannot be used where a large amount of heat is generated, such as by high speed shaft rotation, but is very suitable in low speed shaft rotation, or where there is a reciprocating action of the shaft relative to the body, and the shaft is intermittently exposed for cooling.

In order to maintain the seal 14 against the boss 17 even when no fluid pressure is exerted, I provide a spring 45 which engages a washer 46 having a radial surface suitable for engagement with the spring on one side and a radial surface shaped suitably to engage the sealing member on the other side for applying distributed pressure thereagainst.

I claim:

1. A seal assembly comprising a body member recessed to provide a fluid chamber, fluid therein, a shaft-like member extending through said body member and chamber and movable relative thereto, said body member having a boss projecting from the surrounding surface about said shaft member into the chamber to present an outwardly facing surface surrounding the surface presented by said shaft member and radially spaced outwardly therefrom of a size to be spaced from the outer walls of said chamber, an annular sealing member having portions of its inner surface of different diameters with a radially extending abutment between said portions, the smaller of said portions receiving said shaft member and the larger of said portions receiving the boss of said body member, the outer surface of the sealing member being spaced from the inner wall of the chamber, said surfaces being exposed to the fluid in the chamber to be sealed and presenting a wall between the inner and outer surfaces of such a thickness and such material that it will be moved radially inwardly against said shaft and body members under the pressure to which it is subjected.

2. A seal assembly as in claim 1 wherein said boss is provided with an inwardly tapered surface providing a space about said shaft member and said seal member has a tapered projection entering the space thus provided to contact said tapered surface, and said sealing member presenting a surface area causing the pressure to which it is subjected to force it toward said boss.

3. A seal assembly as in claim 1 wherein said boss is provided with an inwardly tapered surface providing a space about said shaft member and said seal member has a tapered projection entering the space thus provided to contact said tapered surface, and said sealing member presenting a surface area causing the pressure to which it is subjected to force it toward said boss, said sealing member carrying a rigid reenforcing plate at right angles to the axis of said shaft member to assist in the transmission of such pressure.

GEORGE W. DAHL.

REFERENCES CITED

The following references are of record in the file of this patent:

UNITED STATES PATENTS

| Number | Name | Date |
|---|---|---|
| 1,035,063 | Werner | Aug. 6, 1912 |
| 1,697,516 | Hele-Shaw et al. | Jan. 1, 1929 |
| 2,106,293 | Christensen | Jan. 25, 1938 |
| 2,212,291 | Heinze et al. | Aug. 20, 1940 |
| 2,393,967 | Brubaker | Feb. 5, 1946 |
| 2,443,332 | Summers | June 15, 1948 |
| 2,467,312 | Jack | Apr. 12, 1949 |